United States Patent
Lee

(10) Patent No.: US 11,210,581 B2
(45) Date of Patent: Dec. 28, 2021

(54) SYNAPSE AND A SYNAPSE ARRAY

(71) Applicant: SK hynix Inc., Icheon (KR)

(72) Inventor: Sang-Heon Lee, Icheon (KR)

(73) Assignee: SK hynix Inc., Icheon (KR)

( * ) Notice: Subject to any disclaimer, the term of this patent is extended or adjusted under 35 U.S.C. 154(b) by 1004 days.

(21) Appl. No.: 15/723,006

(22) Filed: Oct. 2, 2017

(65) Prior Publication Data

US 2018/0300619 A1    Oct. 18, 2018

(30) Foreign Application Priority Data

Apr. 17, 2017    (KR) ........................ 10-2017-0049192

(51) Int. Cl.
*G06N 3/063*    (2006.01)
*G06N 3/04*    (2006.01)

(52) U.S. Cl.
CPC ............. *G06N 3/0635* (2013.01); *G06N 3/04* (2013.01); *G06N 3/049* (2013.01)

(58) Field of Classification Search
CPC ........ G06N 3/0635; G06N 3/04; G06N 3/049; G06N 3/063; G06F 17/30266; G06F 17/30681; G06F 17/30705; G06F 19/366
USPC .......................................................... 706/29
See application file for complete search history.

(56) References Cited

U.S. PATENT DOCUMENTS

| | | | | |
|---|---|---|---|---|
| 9,514,818 B1 * | 12/2016 | Roizin | .................... | G11C 11/54 |
| 9,620,206 B2 * | 4/2017 | Nazarian | ............. | G06N 3/0635 |
| | | | | 706/27 |
| 2003/0004907 A1 * | 1/2003 | Matsugu | .............. | G06K 9/4628 |
| | | | | 706/26 |
| 2012/0153249 A1 * | 6/2012 | Zhang | ................ | G11C 13/0069 |
| | | | | 257/4 |
| 2014/0032460 A1 * | 1/2014 | Cruz-Albrecht | ..... | G06N 3/0635 |
| | | | | 706/16 |
| 2014/0122402 A1 | 5/2014 | Bichler et al. | | |
| 2014/0214738 A1 * | 7/2014 | Pickett | ..................... | G06N 3/04 |
| | | | | 706/27 |
| 2015/0088797 A1 * | 3/2015 | Kim | ....................... | G06N 3/049 |
| | | | | 706/29 |

(Continued)

FOREIGN PATENT DOCUMENTS

| | | | | |
|---|---|---|---|---|
| CN | 104376362 A | * | 2/2015 | |
| KR | 20130116535 A | * | 10/2013 | ........... G11C 13/003 |

(Continued)

OTHER PUBLICATIONS

Park et al., "Neuromorphic System, and Memory Device" Feb. 14, 2017, KR 10-2017-0020130, KIPO (Year: 2017).*

(Continued)

*Primary Examiner* — Viker A Lamardo

(57) ABSTRACT

A neuromorphic device may include a pre-synaptic neuron, a row line extending from the pre-synaptic neuron in a row direction, a post-synaptic neuron, a column line extending from the post-synaptic neuron in a column direction, and a synapse coupled between the row line and the column line. The synapse may be disposed in an intersection region between the row line and the column line. The synapse may include a first unit synapse and a second unit synapse. The first unit synapse may include a resistive memory device. The second unit synapse may include a phase-changeable memory device.

7 Claims, 12 Drawing Sheets

(56) References Cited

U.S. PATENT DOCUMENTS

| | | | | |
|---|---|---|---|---|
| 2015/0278682 | A1* | 10/2015 | Saxena | G11C 11/54 706/23 |
| 2016/0125287 | A1* | 5/2016 | Pantazi | G06N 3/088 706/26 |
| 2016/0133317 | A1 | 5/2016 | Lee et al. | |
| 2016/0196488 | A1* | 7/2016 | Ahn | G06N 3/049 706/41 |
| 2016/0267379 | A1* | 9/2016 | Eleftheriou | G06N 3/063 |
| 2016/0336064 | A1* | 11/2016 | Seo | G06N 3/088 |
| 2016/0364643 | A1* | 12/2016 | Cruz-Albrecht | G06N 3/049 |
| 2016/0379110 | A1* | 12/2016 | Eleftheriou | G06N 3/0635 706/33 |
| 2017/0270404 | A1* | 9/2017 | Eleftheriou | G06N 3/0635 |
| 2018/0095930 | A1* | 4/2018 | Lu | H03K 19/177 |
| 2018/0232628 | A1* | 8/2018 | Park | G06N 3/063 |
| 2018/0260696 | A1* | 9/2018 | Suda | G06N 3/049 |

FOREIGN PATENT DOCUMENTS

| | | | | |
|---|---|---|---|---|
| KR | 20150017047 A | * | 2/2015 | G06N 3/049 |
| SU | 1596311 A1 | * | 9/1990 | |
| WO | WO-2015001697 A1 | * | 1/2015 | G06N 3/08 |

OTHER PUBLICATIONS

Kochetkov et al., "Multichannel Function Control Device", Sep. 30, 1990, SU 1596311 A1 (Year: 1990).*

Yu et al., "A Neuromorphic Visual System Using RRAM Synaptic Devices with Sub-pJ Energy and Tolerance to Variability: Experimental Characterization and Large-Scale Modeling", Dec. 10-13, 2012, IEEE, 2012 International Electron Devices Meeting (Year: 2012).*

Kang et al., "RRAM based Synaptic Devices for Neuromorphic Visual Systems", Jul. 2015, IEEE (Year: 2015).*

Vourkas et al., "Modeling Memristor-Based Circuit Networks on Crossbar Architectures", 2014, In: Adamatzky A., Chua L. (eds) Memristor Networks. Springer, Cham, https://doi.org/10.1007/978-3-319-02630-5_23 (Year: 2014).*

Yu et al., "Dynamic Behavior of Coupled Memristor Circuits", Jun. 2015, IEEE Transactions On Circuits And Systems—I: Regular Papers, vol. 62, No. 6 (Year: 2015).*

Bin Gao et al., "Metal Oxide Resistive Random Access Memory Based Synaptic Devices For Brain-inspired Computing", 2016, Jpn. J. Appl. Phys. 55 04EA06 (Year: 2016).*

Covi et al., "Analog Memristive Synapse in Spiking Networks Implementing Unsupervised Learning", Oct. 25, 2016, Front. Neurosci. 10:482. doi: 10.3389/fnins.2016.00482 (Year: 2016).*

Burr et al., "Experimental Demonstration and Tolerancing of a Large-Scale Neural Network (165 000 Synapses) Using Phase-Change Memory as the Synaptic Weight Element", Nov. 2015, IEEE Transactions On Electron Devices, vol. 62, No. 11, p. 3498-3507 (Year: 2015).*

Bichler et al., "Visual Pattern Extraction Using Energy-Efficient "2-PCM Synapse" Neuromorphic Architecture", Aug. 2012, IEEE Transactions on Electron Devices, vol. 59, No. 8, p. 2206-2214 (Year: 2012).*

Suri et al., "Phase Change Memory as Synapse for Ultra-Dense Neuromorphic Systems: Application to Complex Visual Pattern Extraction", 2011, IEEE (Year: 2011).*

Park et al., "TiOx-Based RRAM Synapse With 64-Levels of Conductance and Symmetric Conductance Change by Adopting a Hybrid Pulse Scheme for Neuromorphic Computing", Dec. 2016, IEEE Electron Device Letters, vol. 37, No. 12, p. 1559-1562 (Year: 2016).*

* cited by examiner

SYNAPSE AND A SYNAPSE ARRAY

CROSS-REFERENCE TO RELATED APPLICATIONS

This U.S. non-provisional patent application claims priority under 35 U.S.C. § 119(a) to Korean Patent Application No. 10-2017-0049192, filed on Apr. 17, 2017, in the Korean Intellectual Property Office (KIPO), the disclosure of which is incorporated herein by reference in its entirety.

BACKGROUND

1. Field

The present disclosure relates to a neuromorphic device, and more particularly, to a synapse including dual memristors, a synapse array including the synapse, and a neuromorphic device including the synapse array.

2. Description of the Related Art

Recently, much attention has been paid to neuromorphic devices, which include chips that mimic the human brain. A neuromorphic device includes a plurality of pre-synaptic neurons, a plurality of post-synaptic neurons, and a plurality of synapses. The neuromorphic device outputs pulses or spikes having various levels, amplitudes, and/or times, according to a learning state of the neuromorphic device.

SUMMARY

Embodiments of the present disclosure include synapses having dual memristors.

Embodiments of the present disclosure include an array including the synapses having dual memristors.

Embodiments of the present disclosure include neuromorphic devices including the synapses having dual memristors.

The present disclosure is not limited to the above-mentioned embodiments, and it would be obvious to those skilled in the art that there may be other embodiments of the present disclosure that are not mentioned above.

A neuromorphic device in accordance with an embodiment of the present disclosure may include a pre-synaptic neuron, a row line extending from the pre-synaptic neuron in a row direction, a post-synaptic neuron, a column line extending from the post-synaptic neuron in a column direction, and a synapse coupled between the row line and the column line. The synapse may be disposed in an intersection region between the row line and the column line. The synapse may include a first unit synapse and a second unit synapse. The first unit synapse may include a resistive memory device. The second unit synapse may include a phase-changeable memory device.

The first unit synapse may include a first memristor including the resistive memory device and a selecting element, and the second unit synapse may include a second memristor including the phase-changeable memory device and a second selecting element.

The row line may include a first row line and a second row line. The first row line may be electrically connected with the first unit synapse. The second row line may be electrically connected with the second unit synapse.

The column line may include a first column line and a second column line. The first column line may be electrically connected with the first unit synapse. The second column line may be electrically connected with the second unit synapse.

The neuromorphic device may further include a first selecting line being electrically connected with the first selecting element and extending in the column direction and a second selecting line being electrically connected with the second selecting element and extending in the column direction.

The neuromorphic device may further include a selecting signal delay circuit electrically connected with the second selecting line.

The post-synaptic neuron may include a first totalizer electrically connected with the first column line, a second totalizer electrically connected with the second column line, and a normalizer electrically connected with the first totalizer and the second totalizer.

The post-synaptic neuron may further include a pulse generator and a pulse delay circuit.

The post-synaptic neuron may further include an integrator and a comparator between the normalizer and the pulse generator.

The pre-synaptic neuron comprises a row signal delay circuit electrically connected with the second row line.

A neuromorphic device in accordance with an embodiment of the present disclosure may include a pre-synaptic neuron, a first row line and a second row line each extending from the pre-synaptic neuron in a row direction, a post-synaptic neuron, a first column line, a second column line, a first selecting line, and a second selecting line each extending from the post-synaptic neuron in a column direction, a first unit synapse electrically connected with the first row line, the first column line, and the first selecting line, and a second unit synapse electrically connected with the second row line, the second column line, and the second selecting line.

The first unit synapse may include a resistive memory device and a first selecting element. The second unit synapse may include a phase-changeable memory device and a second selecting element.

The neuromorphic device may further include a row signal delay circuit on the second row line.

The neuromorphic device may further include a selecting signal delay circuit on the second selecting line.

The post-synaptic neuron may include a first totalizer electrically connected with the first column line, a second totalizer electrically connected with the second column line, a normalizer electrically connected with the first totalizer and the second totalizer, an integrator electrically connected with the normalizer, and a pulse generator electrically connected with the integrator. The pulse generator may be electrically connected with the first selecting line and the second selecting line.

A neuromorphic device in accordance with an embodiment of the present disclosure may include a pre-synaptic neuron, a row line extending from the pre-synaptic neuron in a row direction, a post-synaptic neuron, a column line extending from the post-synaptic neuron in a column direction, and a synapse coupled between the row line and the column line. The synapse may be disposed in an intersection region between the row line and the column line. The synapse may include a first unit synapse and the second unit synapse. A resistance of the first unit synapse may change more abruptly than a resistance of the second unit synapse in a potentiation mode. The resistance of the second unit synapse may change more abruptly than the resistance of the first unit synapse in a depression mode.

The resistance of the first unit synapse may change more gradually than the resistance of the second unit synapse in the depression mode. The resistance of the second unit synapse may change more gradually than the resistance of the first unit synapse in the potentiation mode.

The first unit synapse may include a resistive memory device. The second unit synapse may include a phase-changeable memory device.

The row line may include a first row line and a second row line. The first row line may be electrically connected with the first unit synapse. The second row line may be electrically connected with the second unit synapse. The column line may include a first column line and a second column line. The first column line may be electrically connected with the first unit synapse. The second column line may be electrically connected with the second unit synapse.

The neuromorphic device may further include a first selecting line electrically connecting the post-synaptic neuron to the first unit synapse, and a second selecting line electrically connecting the post-synaptic neuron to the second unit synapse.

Details of other embodiments are included in the detailed description and drawings.

DETAILED DESCRIPTION

Figure 1A:
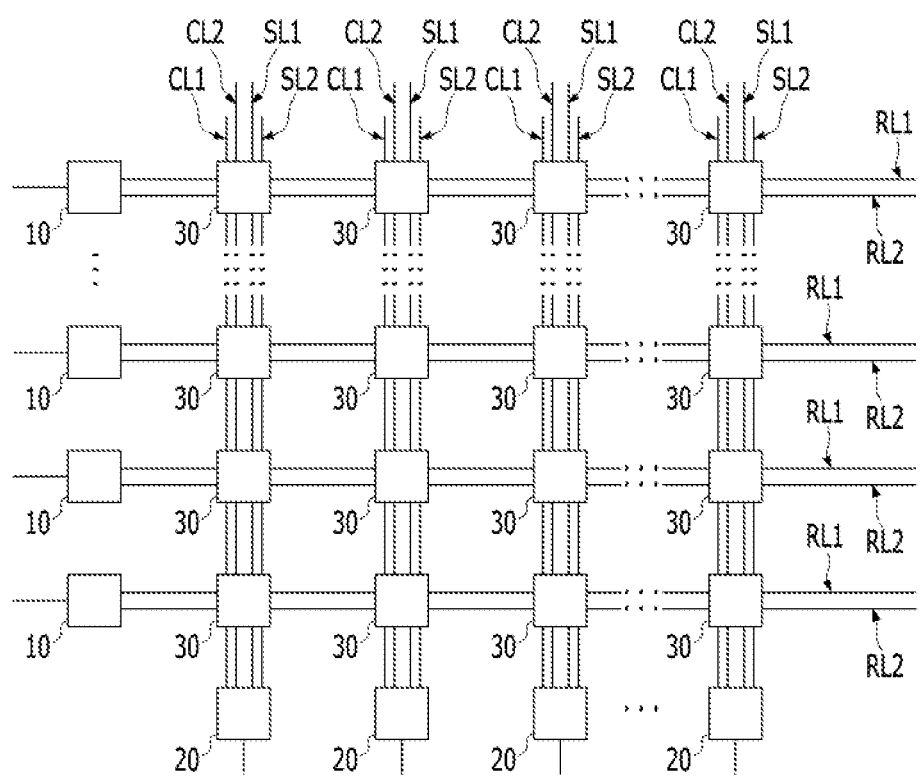
FIGS. 1A and 1B are diagrams schematically illustrating synapse arrays of neuromorphic devices in accordance with embodiments of the present disclosure.

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

Figure 1B:
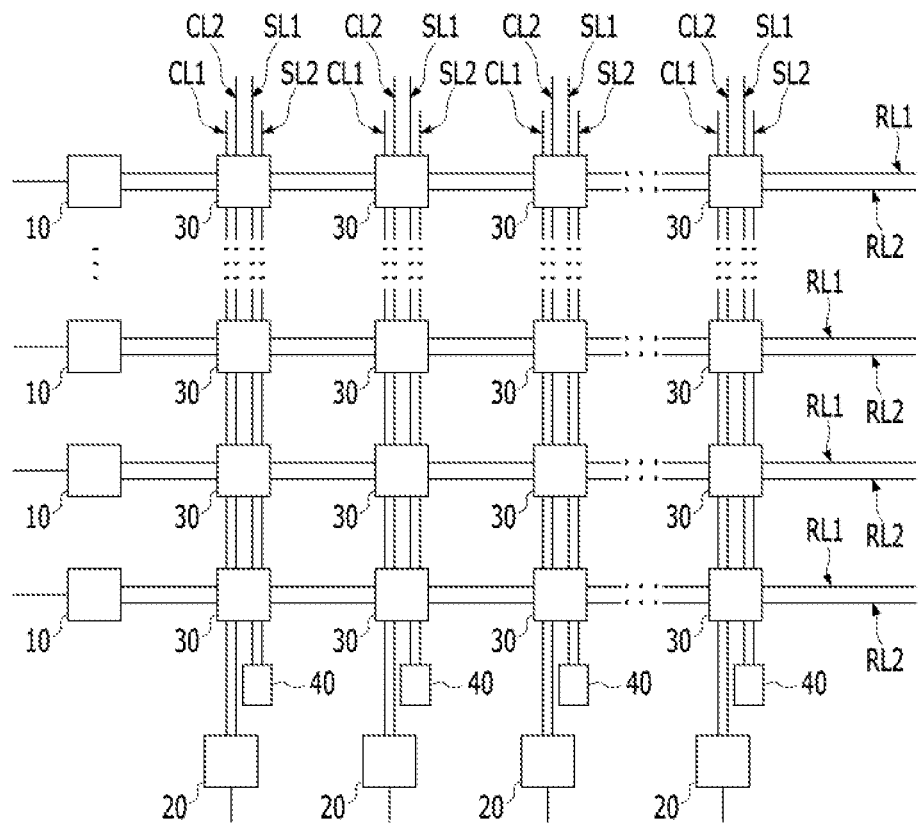

FIGS. 1A and 1B are diagrams schematically illustrating synapse arrays of neuromorphic devices in accordance with embodiments of the present disclosure.

Referring to FIG. 1A, a synapse array in accordance with an embodiment of the present disclosure may include a plurality of pre-synaptic neurons 10, a plurality of post-synaptic neurons 20, and a plurality of synapses 30. The synapse array may include a plurality of row line pairs RL1 and RL2, a plurality of column line pairs CL1 and CL2, and a plurality of selecting line pairs SL1 and SL2. The plurality of row line pairs RL1 and RL2 may extend from the plurality of pre-synaptic neurons 10 in a row direction, respectively. The plurality of column line pairs CL1 and CL2, and the plurality of selecting line pairs SL1 and SL2, may respectively extend from the plurality of post-synaptic neurons 20 in a column direction.

The row line pairs RL1 and RL2 may include first row lines RL1 and second row lines RL2, the column line pairs CL1 and CL2 may include first column lines CL1 and second column lines CL2, and the selecting line pairs SL1 and SL2 may include first selecting lines SL1 and second selecting lines SL2.

The synapses 30 may be disposed and arrayed between the row line pairs RL1 and RL2, the column line pairs CL1 and CL2, and the selecting lines SL1 and SL2. That is, one of the synapses 30 may be electrically connected with one of the first row lines RL1, one of the second row lines RL2, one of the first column lines CL1, one of the second column lines CL2, one of the first selecting lines SL1, and one of the second selecting lines SL2. The synapses 30 may be disposed in intersection regions among the row line pairs RL1 and RL2, the column line pairs CL1 and CL2, and the selecting line pairs SL1 and SL2. For example, the synapses 30 may be disposed in a region where the row line pairs RL1 and RL2, the column line pairs CL1 and CL2, and the selecting line pairs SL1 and SL2 intersect in a direction perpendicular to the row direction and the column direction. As an illustrative example, four of the pre-synaptic neurons 10 four of the post-synaptic neurons 20, and sixteen of the synapses 30 are illustrated in FIGS. 1A and 1B.

The pre-synaptic neurons 10 may transmit row signals to the synapses 30 through the row line pairs RL1 and RL2. Each of the row signals may have a pulse shape.

The post-synaptic neurons 20 may receive column signals from the synapses 30 through the column line pairs CL1 and CL2, and may transmit selecting signals to the synapses 30 through the selecting line pairs SL1 and SL2. Each of the selecting signals may have a pulse shape.

The synapses 30 may include variable resistors having multiple resistance levels. The synapses 30 may be gradually changed from/to a high resistance state (HRS) to/from a low resistance state (LRS) according to numbers of pulses input to the synapses 30 from the pre-synaptic neurons 10 and/or the post-synaptic neurons 20, time differences between the input pulses, and/or voltage differences between the input pulses. Embodiments of the synapses 30 will also be described with reference to other drawings.

Referring to FIG. 1B, a synapse array of a neuromorphic device in accordance with the present disclosure may include the plurality of pre-synaptic neurons 10, the plurality of post-synaptic neurons 20, the plurality of synapses 30, and a plurality of selecting controllers 40. The synapse array may further include the plurality of row line pairs RL1 and RL2, the plurality of column line pairs CL1 and CL2, and the plurality of selecting line pairs SL1 and SL2. The plurality of row line pairs RL1 and RL2 may extend from the plurality of pre-synaptic neurons 10 in the row direction, respectively. The plurality of column line pairs CL1 and CL2, and the plurality of selecting line pairs SL1 and SL2, may respectively extend from the plurality of post-neurons 20 in the column direction.

The post-synaptic neurons 20 may receive the column signals from the synapses 30 through the column line pairs CL1 and CL2, and the selecting controllers 40 may transmit the selecting signals to the synapse 30 through the selecting line pairs SL1 and SL2. Each of the selecting signals may have a pulse shape.

FIGS. 2A to 2D are diagrams schematically illustrating pre-synaptic neurons 10a to 10d of synapse arrays of a neuromorphic devices in accordance with embodiments of the present disclosure.

Figure 2A:
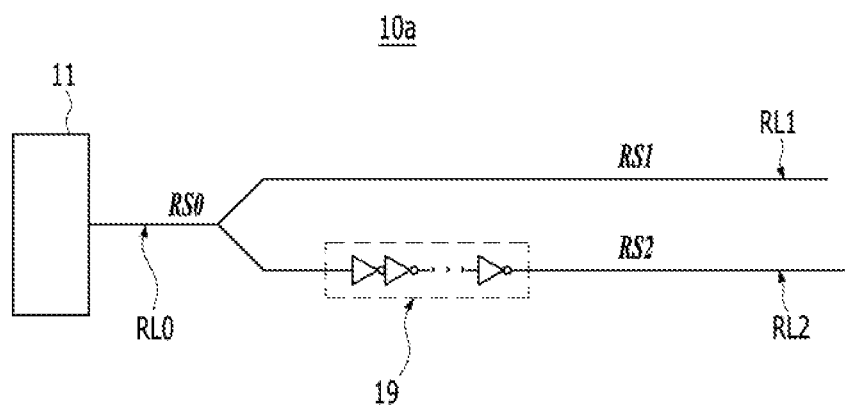
FIGS. 2A to 2D are diagrams schematically illustrating pre-synaptic neurons of synapse arrays of neuromorphic devices in accordance with embodiments of the present disclosure.

Referring to FIG. 2A, a pre-synaptic neuron 10a of a synapse array may include a row signal generator 11 and a row signal delay circuit 19.

The row signal generator 11 may output a basic row signal RS0 onto a basic row line RL0. The basic row signal RS0 may have a pulse shape, and include at least one of a potentiation signal to potentiate the synapse 30, a depression signal to depress the synapse 30, and a data signal to output data stored by the synapse 30. The basic row line RL0 may be divaricated into the first row line RL1 and the second row line RL2.

The row signal delay circuit 19 may be disposed on the second row line RL2. The row signal delay circuit 19 may include an odd number of inverters. Accordingly, the row signal delay circuit 19 may output a second row signal RS2, which has an inverted phase and a delayed timing with respect to the basic row signal RS0, to the synapse 30 for a predetermined time. In addition, the first row line RL1 may provide a first row signal RS1, which has the same phase and the same pulse timing as the basic row signal RS0, to the synapse 30. Because the basic row signal RS0 and the first row signal RS1 have the same phase and the same pulse timing, the second row signal RS2 may also have an inverted phase and a delayed pulse timing with respect to the first row signal RS1.

Figure 2B:
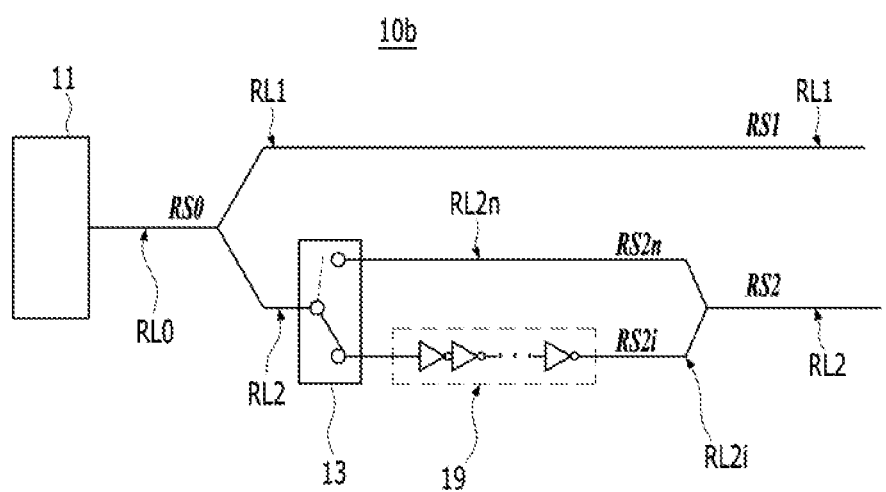

Referring to FIG. 2B, a pre-synaptic neuron 10b of a synapse array of a neuromorphic device in accordance with an embodiment of the present disclosure may include a row signal generator 11, a row line selector 13, and a row signal delay circuit 19. A basic row line RL0 may be divaricated into a first row line RL1 and a second row line RL2, and the second row line RL2 may be divaricated into a non-inverted second row line RL2n and an inverted second row line RL2i. The divaricated non-inverted second row line RL2n and the inverted second row line RL2i may be merged into the second row line RL2.

The row line selector 13 may be disposed at a junction point in which the second row line RL2 is divaricated into the non-inverted second row line RL2n and the inverted second row line RL2i. The row line selector 13 may selectively electrically connect a front portion of the second row line RL2, which has been divaricated from the basic row line RL0, to one of the non-inverted second row line RL2n and the inverted second row line RL2i. For example, when it is desirable that the second row signal RS2 has the same phase and the same pulse timing as the basic row signal RS0, the row line selector 13 may electrically connect the basic row line RL0 to the non-inverted second row line RL2n. Accordingly, the first row signal RS1 and the second row signal RS2 may have the same phase and the same pulse timing. In contrast, when it is desirable that the second row signal RS2 has an inverted phase and a delayed pulse timing from the basic row signal RS0, the row line selector 13 may electrically connect the basic row line RL0 to the inverted second row line RL2i. Accordingly, the second row signal RS2 may have the inverted phase and the delayed pulse timing from the basic row signal RS0.

The non-inverted second row line RL2n and the inverted second row line RL2i may be merged into the second row line RL2. Accordingly, the second row signal RS2 output on the second row line RL2 may be one of the non-inverted row signal RS2n and the inverted second row signal RS2i. The non-inverted row signal RS2n may have the same phase and the same pulse timing as the first row signal RS1, and the inverted row signal RS2i may have the inverted phase and the delayed pulse timing, with respect to the basic row signal RS0 or the first row signal RS1. Accordingly, the second row signal RS2 may have the same phase and the same pulse timing, or may have the inverted phase and the delayed pulse timing, with respect to the basic row signal RS0 and the first row signal RS1.

Figure 2C:
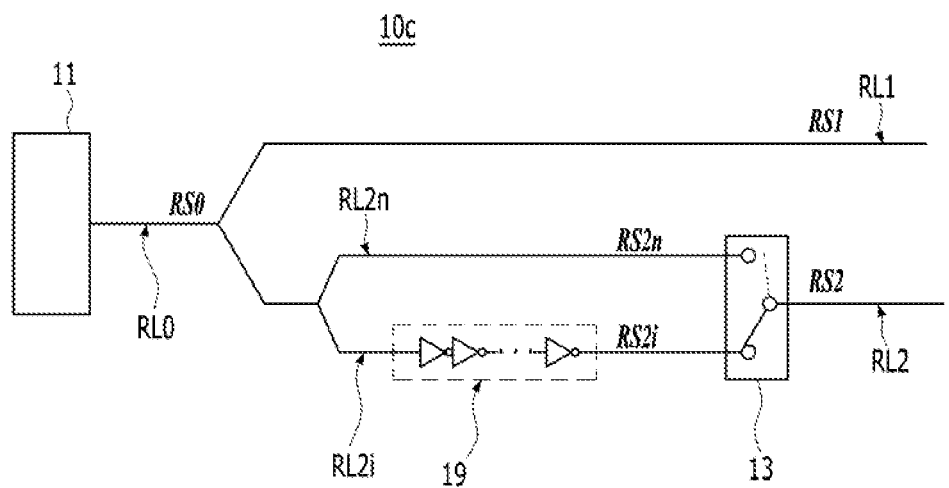

Referring to FIG. 2C, a pre-synaptic neuron 10c of a synapse array of a neuromorphic device in accordance with an embodiment of the present disclosure may include a row signal generator 11, a row signal delay circuit 19, and a row line selector 13.

The row line selector 13 may be disposed at a junction point which the non-inverted second row line RL2n and the inverted second row line RL2i are merged into the second row line RL2. The row line selector 13 may selectively electrically connect one of the non-inverted second row line RL2n and the inverted second row line RL2i to the second row line RL2, according to an operation mode of the synapse array of the neuromorphic device. Accordingly, the second row signal RS2 may be one of the non-inverted row signal RS2n and the inverted row signal RS2i.

Figure 2D:
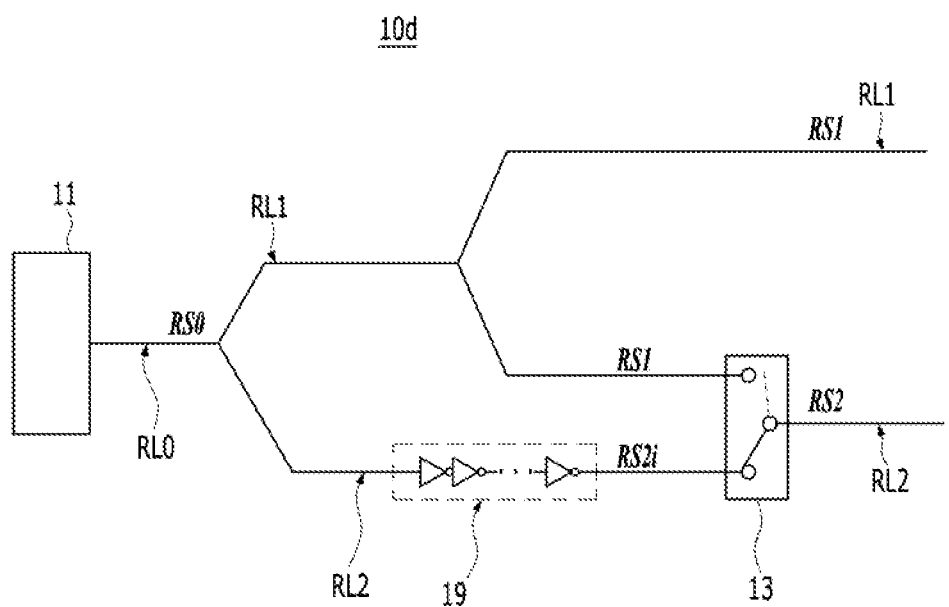

Referring to FIG. 2D, a pre-synaptic neuron 10d may include a row signal generator 11, a row signal delay circuit 19, and a row line selector 13.

A basic row line RL0 may be divaricated into a first row line RL1 and a second row line RL2. The row signal delay circuit 19 may be disposed on the second row line RL2, and may invert and delay the basic row signal RS0 to generate the inverted second row signal RS2i. The row line selector 13 may selectively electrically connect one of the first row line RL1 and the inverted second row line RL2i to the second row line RL2, according to the operation mode of the synapse array of the neuromorphic device. Accordingly, the second row signal RS2 may be one of the first row signal RS1 and the inverted second row signal RS2i.

Figure 3A:
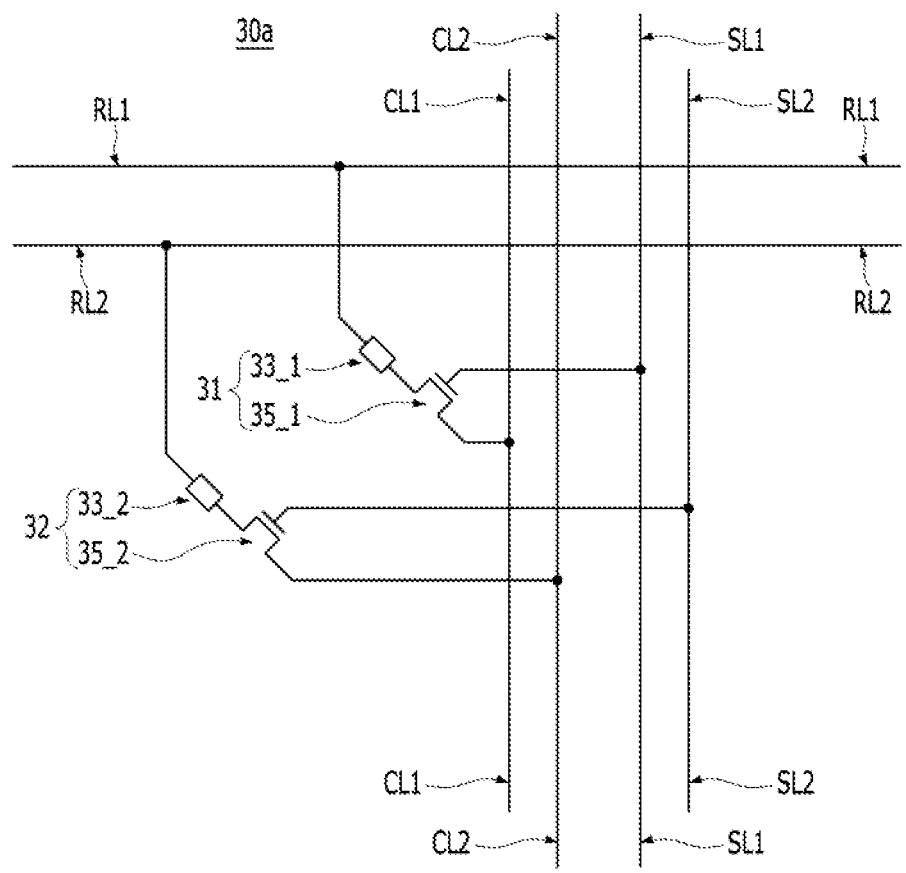
FIGS. 3A and 3B are diagrams schematically illustrating synapses and synapse arrays of neuromorphic devices in accordance with embodiments of the present disclosure.
Figure 3B:
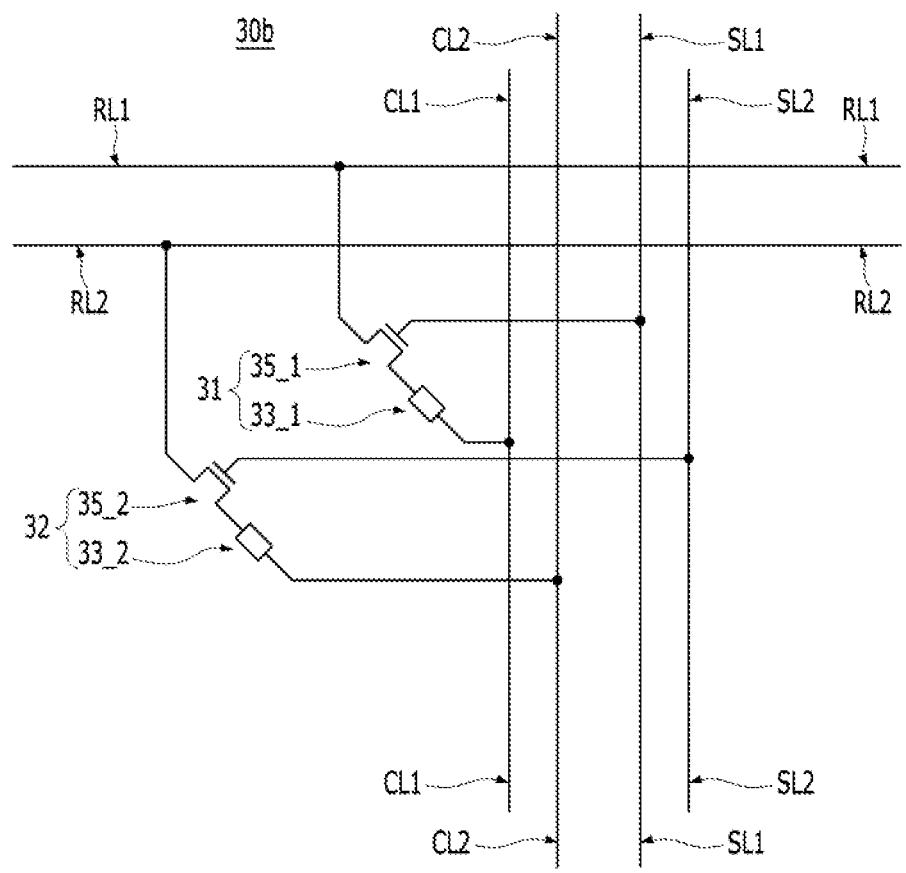

FIGS. 3A and 3B are diagrams schematically illustrating synapses 30a and 30b of synapse arrays of neuromorphic devices in accordance with embodiments of the present disclosure.

Referring to FIGS. 3A and 3B, synapses 30a and 30b may each include a first unit synapse 31 and a second unit synapse 32. The first unit synapse 31 may include a first memristor 33_1 and a first selecting element 35_1, and the second unit synapse 32 may include a second memristor 33_2 and a second selecting element 35_2. The first selecting element 35_1 and the second selecting element 35_2 may each include a 3-terminal selecting element such as a MOS transistor or a 2-terminal selecting element such as a diode. In the embodiments of the present disclosure described with respect to FIGS. 3A and 3B, the first selecting element 35_1 and the second selecting element 35_2 may be referred to as a first transistor 35_1 and a second transistor 35_2, respectively.

Referring to FIG. 3A, a first electrode of the first memristor 33_1 may be electrically connected with the first row line RL1, and a second electrode of the first memristor 33_1 may be electrically connected with a drain electrode of the first transistor 35_1. A source electrode of the first transistor 35_1 may be electrically connected with the first column line CL1, and a gate electrode of the first transistor 35_1 may be electrically connected with the first selecting line SL1. The first memristor 33_1 may include a resistive memory device such as a resistive random access memory (ReRAM).

A first electrode of the second memristor 33_2 may be electrically connected with the second row line RL2, and a second electrode of the second memristor 33_2 may be electrically connected with a drain electrode of the second transistor 35_2. A source electrode of the second transistor 35_2 may be electrically connected with the second column line CL2, and a gate electrode of the second transistor 35_2 may be electrically connected with the second selecting line SL2. The second memristor 33_2 may include a phase-changeable memory device such as a phase-changeable random access memory (PCRAM).

The first unit synapse 31 may receive a first row signal, e.g., the first row signal RS1 illustrated in FIGS. 2A to 2D, from the first row line RL1; and the second unit synapse 32 may receive a second row signal, e.g., the second row signal RS2 illustrated in FIGS. 2A to 2D, from the second row line RL2.

Comparing the synapse 30*b* shown in FIG. 3B with the synapse 30*a* shown in FIG. 3A, positions of the first memristor 33_1 and the first transistor 35_1 in the first unit synapse 31 may be reversed, and positions of the second memristor 33_2 and the second transistor 35_2 in the second unit synapse 32 may be reversed. Specifically, the drain electrode of the first transistor 35_1 of the first unit synapse 31 may be electrically connected with the first row line RL1, the source electrode of the first transistor 35_1 may be electrically connected with the first electrode of the first memristor 33_1, and the second electrode of the first memristor 33_1 may be electrically connected with the first column line CL1. Furthermore, the drain electrode of the second transistor 35_2 of the second unit synapse 32 may be electrically connected with the second row line RL2, the source electrode of the second transistor 35_2 may be electrically connected with the first electrode of the second memristor 33_2, and the second electrode of the second memristor 33_2 may be electrically connected with the second column line CL2.

Figure 4A:
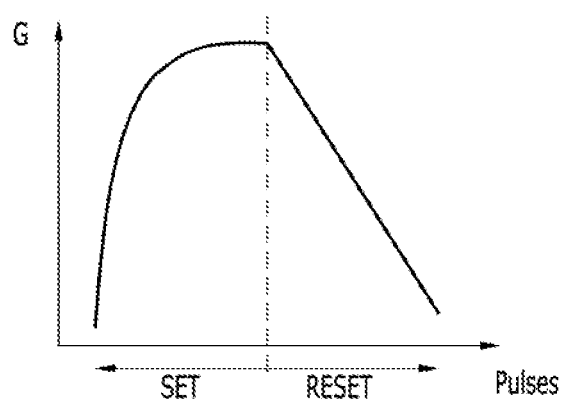
FIG. 4A is a graph schematically illustrating a change in conductivity of a resistive memory device with respect to a number of pulses applied to the resistive memory device in accordance with an embodiment of the present disclosure.

FIG. 4A is a graph schematically illustrating a change in conductivity G of a resistive memory device with respect to a number of pulses applied to the resistive memory device in accordance with an embodiment of the present disclosure.

Referring to FIG. 4A, the resistive memory device may exhibit an abrupt change in conductivity G, in a potentiation operation, that is, a set operation, and a gradual change in conductivity G in a depression operation, that is, a reset operation.

The resistive memory device may exhibit a non-linear change in conductivity G and a non-linear change in resistance in the potentiation operation, and may exhibit a linear change in conductivity G and a linear change in resistance in the depression operation. Accordingly, the resistive memory device can be used as a synapse that can undergo the depression operation, i.e., a depressive synapse.

Figure 4B:
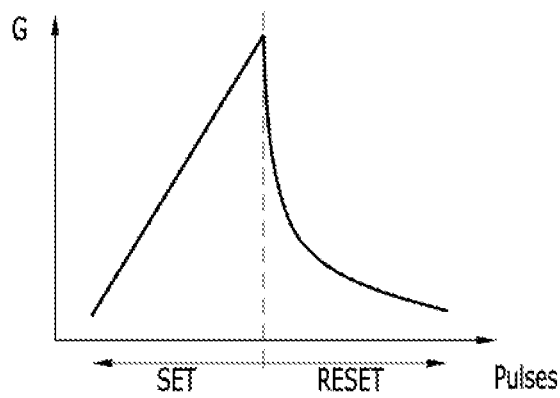
FIG. 4B is a graph schematically illustrating a change in conductivity of a phase-changeable memory device with respect to a number of pulses applied to the phase-changeable memory device in accordance with an embodiment of the present disclosure.

FIG. 4B is a graph schematically illustrating a change in conductivity G of a phase-changeable memory device with respect to a number of pulses applied to the phase-changeable memory device.

Referring to FIG. 4B, the phase-changeable memory device may exhibit a gradual change in conductivity G in the potentiation operation, that is, the set operation, and an abrupt change in conductivity in the depression operation, that is, the reset operation.

The phase-changeable memory device may have a linear change in conductivity G and a linear change in resistance in the potentiation operation, and may have a non-linear change in conductivity G and a non-linear change in resistance in the depression operation. Accordingly, the phase-changeable memory device can be used as a synapse that can undergo the potentiation operation, i.e., a potentiating synapse.

In some embodiments of the present disclosure, referring to FIGS. 3A and 3B, the first memristor 33_1 of the first unit synapse 31 may include the resistive memory device, and the second memristor 33_2 of the second unit synapse 32 may include the phase-changeable memory device. Accordingly, the conductivity and the resistance of the first memristor 33_1 may change more abruptly than the conductivity and resistance of second memristor 33_2 in the potentiation operation, and conductivity and resistance of the second memristor 33_2 may change more abruptly than the conductivity and resistance changes of the second memristor 33_2 in the depression operation. Accordingly, in an embodiment, a resistance of the first unit synapse 31 changes more abruptly than a resistance of the second unit synapse 32 in the potentiation operation, and the resistance of the second unit synapse 32 changes more abruptly than the resistance of the first unit synapse 31 in the depression operation. In other words, the resistance of the first unit synapse 31 may change more gradually than the resistance of the second unit synapse 32 in the depression operation, and the resistance of the second unit synapse 32 may change more gradually than the resistance of the first unit synapse 31 in the potentiation operation. The synapses 30*a* and 30*b* in accordance with the embodiments of the present disclosure may include both of the first unit synapse 31, which includes the resistive memory device, and the second unit synapse 32, which includes the phase-changeable memory device. According to embodiments of the present disclosure, the first unit synapse 31 of each of the synapses 30*a* and 30*b* can be used as a depressive synapse by lowering the total resistance level of the synapse 30*a* or 30*b* in the depression operation. The second unit synapse 32 of each of the synapses 30*a* and 30*b* can be used as a potentiating synapse by raising the total resistance level of the synapse 30*a* or 30*b* in the potentiation operation.

Figure 5A:
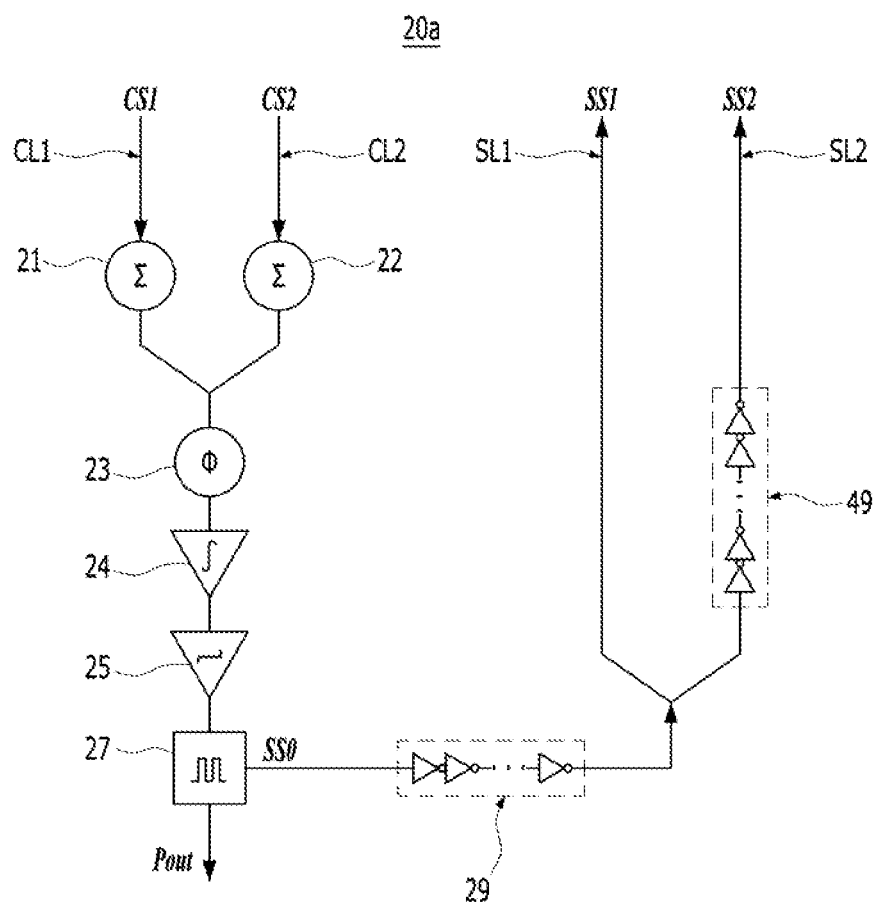
FIGS. 5A and 5B are diagrams schematically illustrating post-synaptic neurons and synapse arrays of neuromorphic devices in accordance with embodiments of the present disclosure.
Figure 5B:
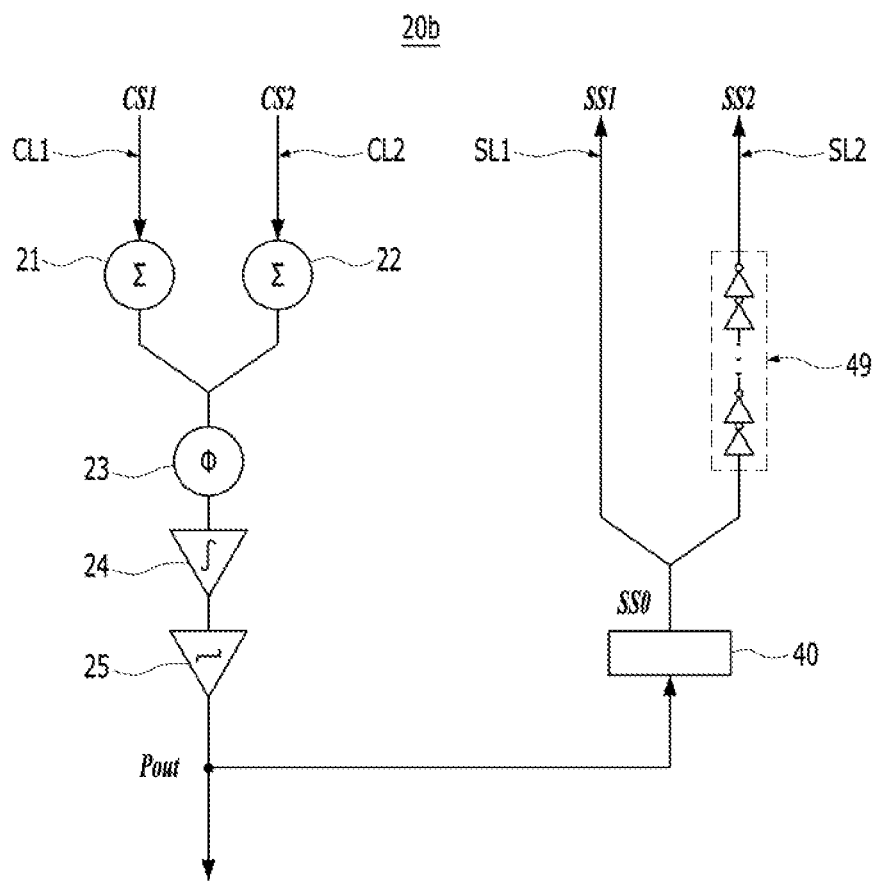

FIGS. 5A and 5B are diagrams schematically illustrating post-synaptic neurons 20*a* and 20*b* of synapse arrays of neuromorphic devices in accordance with embodiments of the present disclosure.

Referring FIG. 5A, a post-synaptic neuron 20*a* of a synapse array of a neuromorphic device in accordance with an embodiment of the present disclosure may include a first totalizer 21, a second totalizer 22, a normalizer 23, an integrator 24, a comparator 25, a pulse generator 27, a pulse delay circuit 29, and a selecting signal delay circuit 49.

The first totalizer 21 may be disposed on the first column line CL1, and the second totalizer 22 may be disposed on the second column line CL2. Accordingly, the first totalizer 21 may totalize first synapse weights of first unit synapses, which are electrically connected with the first column line CL1, and the second totalizer 22 may totalize second synapse weights of second unit synapses, which are electrically connected with the second column line CL2. In an embodiment, the first unit synapses and the second unit synapses may include the first unit synapse 31 and the second unit synapse 32, respectively, of FIGS. 3A and 3B.

The normalizer 23 may normalize a sum of the first synapse weights and a sum of the second synapse weights and may transmit the normalized synapse weights to the integrator 24. For example, the normalizer 23 may transmit a total sum of the totalized first synapse weights totalized by the first totalizer 21 and the totalized second synapse weights totalized by the second totalizer 22, or may transmit an average value of the first synapse weights and the second synapse weights, to the integrator 24.

The integrator 24 may integrate the normalized synapse weights and transmit the integrated synapse weights to the comparator 25.

When the integrated synapse weights are greater than a reference voltage, the comparator 25 may output a firing signal.

The pulse generator 27 may output an output signal Pout and a basic selecting signal SS0 when the pulse generator 27 receives the firing signal from the comparator 25. Each of the output signal Pout and the basic selecting signal SS0 may be pulse-shaped. The output signal Pout may be transmitted to a next synapse array or an output device. The basic selecting signal SS0 may be provided to the pulse delay circuit 29.

The pulse delay circuit 29 may delay the basic selecting signal SS0 output from the pulse generator 27, and may provide the delayed basic selecting signal SS0 to the first selecting line SL1 and the second selecting line SL2. The pulse delay circuit 29 may include an even number of inverters. In an embodiment, the pulse delay circuit 29 may delay the basic selecting signal SS0 output from the pulse generator 27 according to a current operation mode of the corresponding synapse array of the neuromorphic device, such as an initializing mode, a potentiation mode, a depression mode, a read-out mode, etc.

The delayed basic selecting signal SS0 may be divaricated and provided to the first selecting line SL1 and the second selecting line SL2.

The selecting signal delay circuit 49 may be disposed on the second selecting line SL2. The selecting signal delay circuit 49 may include an even number of inverters. Accordingly, the selecting signal delay circuit 49 may further delay the delayed basic selecting signal SS0, and output the further delayed basic selecting signal SS0 as a second selecting signal SS2. The delayed basic selecting signal SS0 provided to the first selecting line SL1 by the pulse delay circuit 29 may be provided as a first selecting signal SS1. Accordingly, the second selecting signal SS2 may be more delayed than the first selecting signal SS1. The first selecting signal SS1 may be applied to gate electrodes of first transistors of the first unit synapses through the first selecting line SL1, and the second selecting signal SS2 may be applied to gate electrodes of second transistors of the second unit synapses through the second selecting line SL2. In an embodiment, the first transistors and the second transistors may include the first transistor 35_1 and the second transistor 35_2, respectively, illustrated in FIGS. 3A and 3B.

Referring to FIG. 5B, a post-synaptic neuron 20b of a synapse array of a neuromorphic device in accordance with an embodiment of the present disclosure may include a first totalizer 21, a second totalizer 22, a normalizer 23, an integrator 24, a comparator 25, a selecting controller 40, and a selecting signal delay circuit 49. In comparison with the post-synaptic neuron 20a shown in FIG. 5A, the post-synaptic neuron 20b may omit the pulse generator 27 and the pulse delay circuit 29, and may further include the selecting controller 40. Portions of the output signal Pout of the comparator 25 may be input to the selecting controller 40. The selecting controller 40 may generate and delay pulses based on the output signal Pout. For example, the selecting controller 40 may include the pulse generator 27 and the pulse delay circuit 29 shown in FIG. 5A. In another embodiment of the present disclosure, the post-synaptic neuron 20b may include the pulse generator 27 as illustrated in FIG. 5A. In this embodiment, the selecting controller 40 may be separate from the pulse generator 27, and portions of the output signal Pout of the pulse generator 27 of FIG. 5A may be input to the selecting controller 40.

Figure 6:
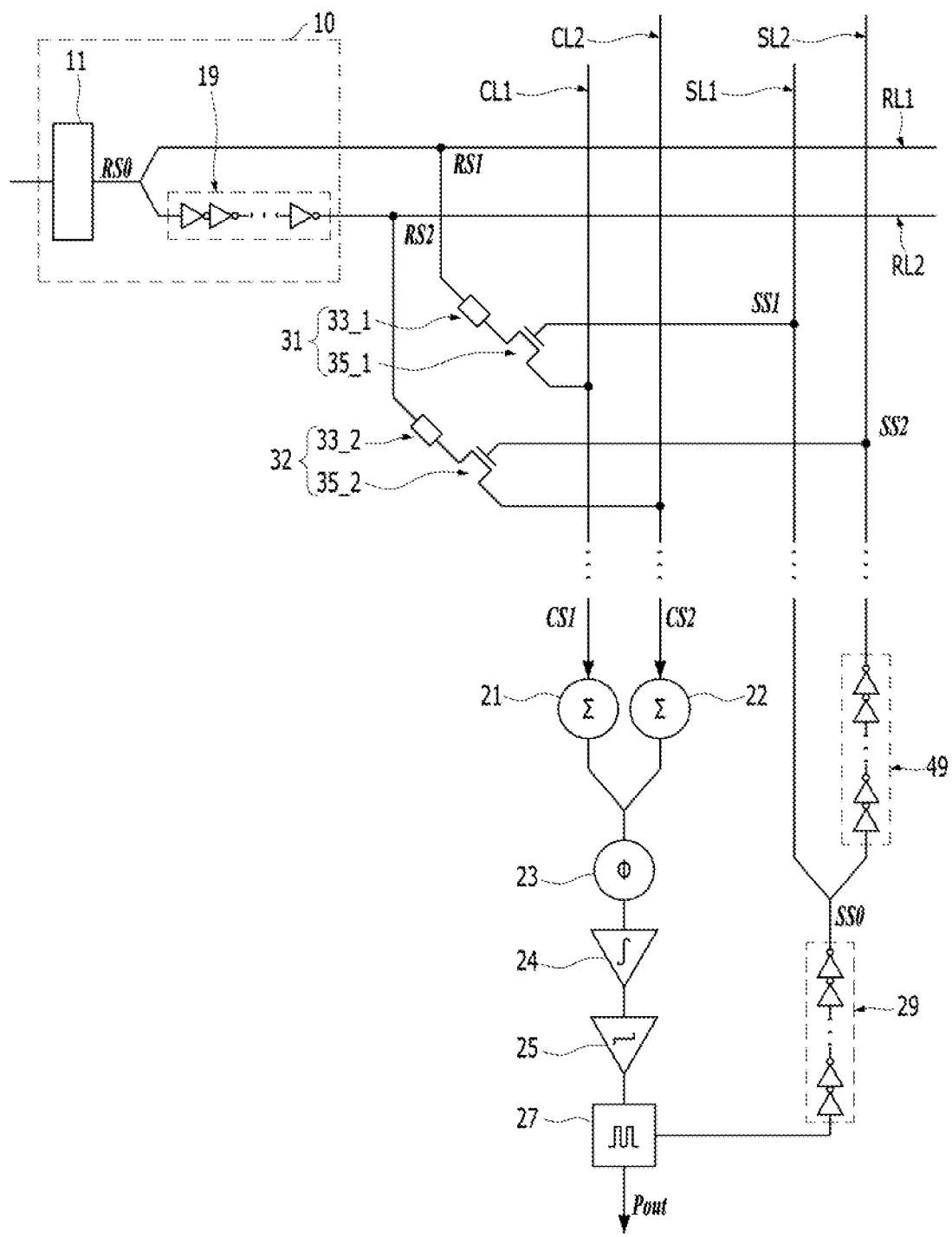
FIG. 6 is a diagram schematically illustrating a synapse array of a neuromorphic device in accordance with an embodiment of the present disclosure.
Figure 7A:
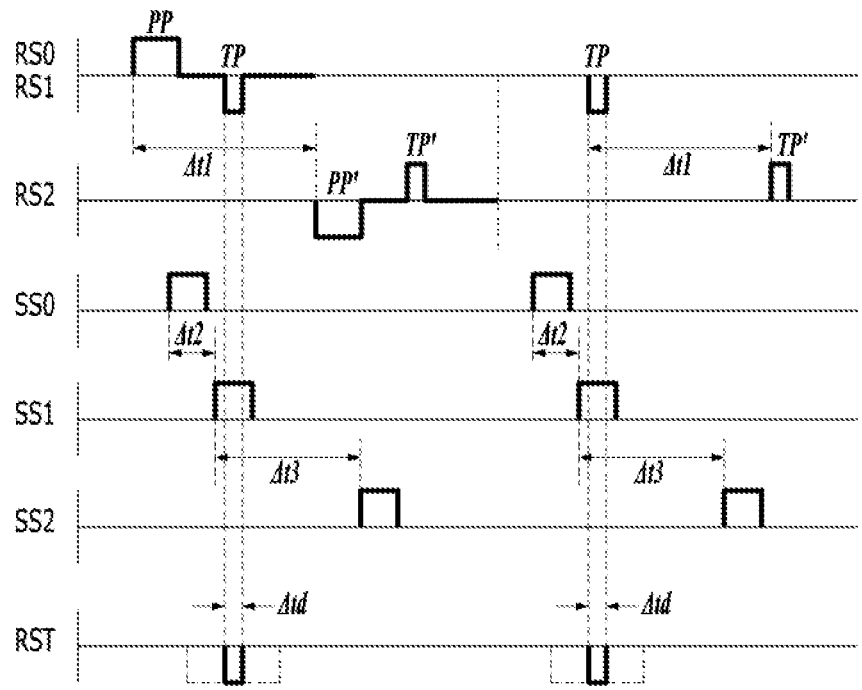
FIG. 7A is a timing diagram schematically illustrating a method for depressing a synapse in accordance with an embodiment of the present disclosure.
Figure 7B:
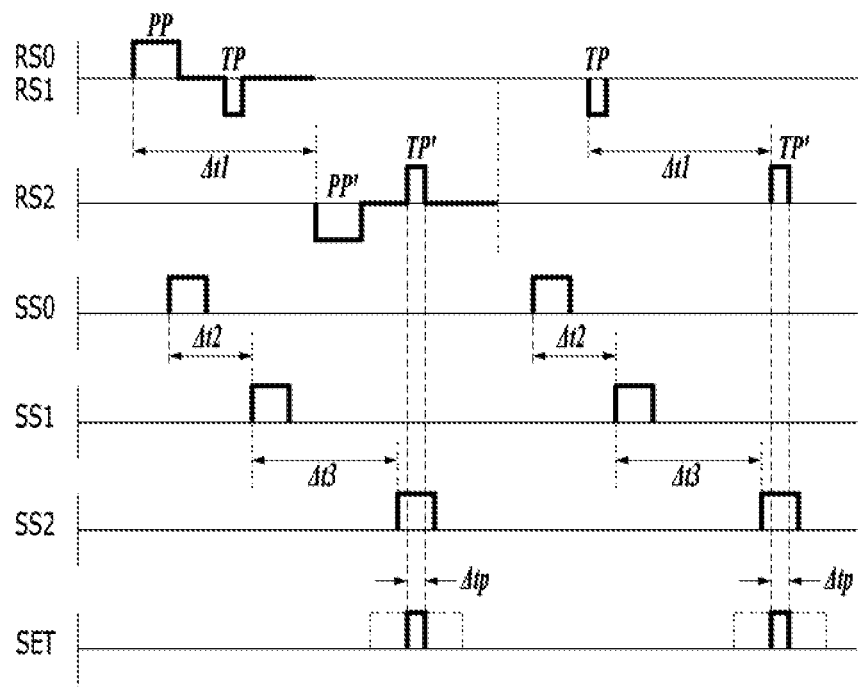
FIG. 7B is a timing diagram schematically illustrating a method for potentiating a synapse in accordance with an embodiment of the present disclosure.

FIG. 6 is a diagram schematically illustrating a synapse array of a neuromorphic device in accordance with an embodiment of the present disclosure. FIG. 7A is a timing diagram schematically illustrating a method for depressing a synapse. FIG. 7B is a timing diagram schematically illustrating a method for potentiating the synapse.

Referring to FIGS. 6 and 7A, the method for depressing the synapse in accordance with an embodiment of the present disclosure may include gradually raising a resistance of a first memristor 33_1 of a first unit synapse 31 by applying reset pulses RESET to the first memristor 33_1. Specifically, a basic row signal RS0 generated from a row signal generator 11 may be divaricated into a first row signal RS1 and a second row signal RS2, which are input to the first unit synapse 31 and the second unit synapse 32, respectively.

The second row signal RS2 may have an inversed phase and delayed pulse timing with respect to the first row signal RS1. The second row signal RS2 may be delayed with respect to the first row signal RS1 by a first delay time $\Delta t1$. The basic row signal RS0 and the first row signal RS1 may include a pre-pulse PP and a training pulse TP, and the second row signal RS2 may include a pre-pulse PP' and a training pulse TP'. The pre-pulse PP may indicate that the synapse is in an initialized state, or may set a mode of the synapse.

Portions of output signals Pout generated from a pulse generator 27 may be delayed by a pulse delay circuit 29 and provided as a first selecting signal SS1 on a first selecting line SL1 and as a second selecting signal SS2 on a second selecting line SL2.

The pulse delay circuit 29 may delay the portions of the output signals Pout by a second delay time $\Delta t2$. The second delay time $\Delta t2$ may be set so that the training pulses TP of the first row signal RS1 overlap with pulses of the first selecting signal SS1, and so that inverted training pulses TP' of the second row signal RS2 do not overlap with pulses of the second selecting signal SS2. The second delay time $\Delta t2$ may be controlled by the pulse delay circuit 29.

The pulse timing of the second selecting signal SS2 may be delayed with respect to the first selecting signal SS1 by the selecting signal delay circuit 49. The second selecting signal SS2 may be delayed with respect to the first selecting signal SS1 by a third delay time $\Delta t3$.

During a depressing time period Δtd, in which the training pulses TP of the first row signals RS1 and the pulses of the first selecting signal SS1 overlap each other, the reset pulse RESET can depress the first memristor 33_1.

Referring to FIGS. 6 and 7B, the method for potentiating the synapse in accordance with an embodiment of the present disclosure may include gradually lowering a resistance of the second memristor 33_2 by applying set pulses SET to the second memristor 33_2 of the second unit synapse 32.

Portions of the output signals Pout generated from the pulse generator 27 may be delayed by the pulse delay circuit 29 and provided as the first selecting signal SS1 on the first selecting line SL1, and the portions of the output signals Pout further delayed by the third delay time Δt3 may be provided as the second selecting signal SS2 on the second selecting line SL2. The second delay time Δt2 and the third delay time Δt3 may be set so that the inverted training pulses TP' of the second row signal RS2 overlaps with pulses of the second selecting signal SS2, and so that the training pulses TP of the first row signal RS1 do not be overlap with pulses of the first selecting signal SS1. During a potentiating time period Δtp, in which the inverted training pulses TP' of the second row pulse RS1 and the pulses of the second selecting signal SS2 overlap each other, the set pulse SET can potentiate the second memristor 33_2.

Referring to FIG. 6, in the read-out mode, first column signals CS1 of the first unit synapses 31 and second column signals CS2 of the second unit synapses 32 may be totalized by a first totalizer 21 and a second totalizer 22, respectively. A normalizer 23 may generate normalized synapse weights by normalizing the totalized first column signals CS1 and the totalized second column signals CS2. The normalized synapse weights may be provided to an integrator 24. In the read-out mode, the first row signals RS1 and the second row signals RS2 may have the same phase and the same pulse timing.

When polarities of the resistive memory device used as the first memristor 33_1 and the phase-changeable memory device used as the second memristor 33_2 are changed, polarities of the set pulse SET and the reset pulse RESET can be changed. For example, a positive pulse can be changed into a negative pulse, and/or a negative pulse can be changed into a positive pulse.

Figure 8:
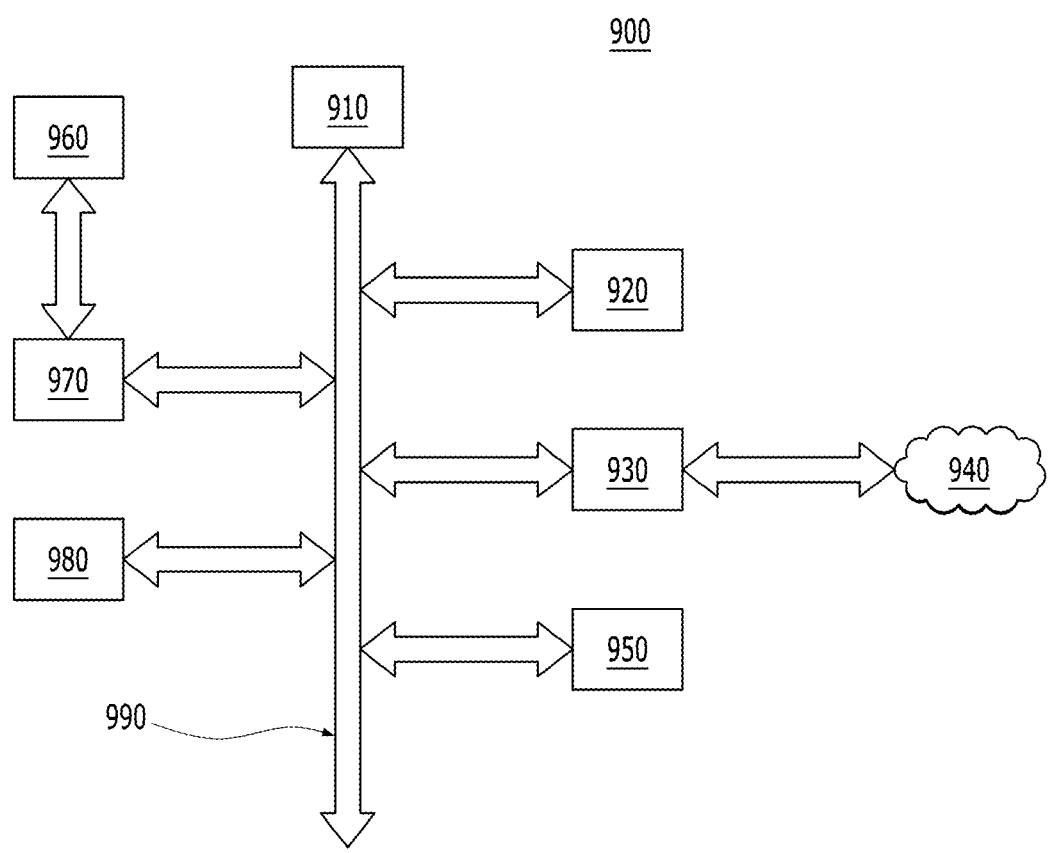
FIG. 8 is a diagram schematically illustrating a pattern recognition system in accordance with an embodiment of the present disclosure.

FIG. 8 is a diagram schematically illustrating a pattern recognition system 900 in accordance with an embodiment of the present disclosure. For example, the pattern recognition system 900 may include any of a speech recognition system, an imaging recognition system, a code recognition system, a signal recognition system, and one or more systems for recognizing various patterns.

Referring to FIG. 8, the pattern recognition system 900 in accordance with the embodiment of the present disclosure may include a Central Processing Unit (CPU) 910, a memory unit 920, a communication control unit 930, a network 940, an output unit 950, an input unit 960, an Analog-Digital Converter (ADC) 970, a neuromorphic unit 980, and/or a bus 990. The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing speech and imaging patterns based on the output from the neuromorphic unit 980.

The CPU 910 may be connected with the memory unit 920, the communication control unit 930, the output unit 950, the ADC 970, and the neuromorphic unit 980 through the bus 990.

The memory unit 920 may store various pieces of information, which are stored in the pattern recognition system 900. The memory unit 920 may include one or more of a volatile memory device, such as a DRAM or SRAM, a nonvolatile memory, such as PRAM, MRAM, ReRAM, or NAND flash memory, and one or more various memory units, such as a Hard Disk Drive (HDD) and a Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include one or more of a speaker, a printer, a monitor, a display panel, a beam projector, a hologrammer, or other various output devices. The output unit 950 may output, for example, speech and/or image recognition data.

The input unit 960 may include one or more of a microphone, a camera, a scanner, a touch pad, a keyboard, a mouse, a mouse pen, or one or more of various sensors.

The ADC 970 may convert analog data inputted from the input unit 960 into digital data.

The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

According to the embodiments of the present disclosure, the synapse includes the dual memristors so that the synapse can have symmetric resistance variations in the potentiation operation and the depression operation.

The foregoing was for illustration of the embodiments only and is not to be construed as limiting thereof. Although a few embodiments have been described for illustrative purposes, it will be apparent to those skilled in the art that various changes and modifications may be made without departing from the spirit and scope of the disclosure, as defined in the following claims.

What is claimed is:

1. A neuromorphic device comprising:
   a plurality of pre-synaptic neurons;
   a plurality of first row lines and a plurality of second row lines each extending from a corresponding one of the pre-synaptic neurons in a row direction;
   a plurality of post-synaptic neurons;
   a plurality of first column lines, a plurality of second column lines, a plurality of first selecting lines, and a plurality of second selecting lines each extending from a corresponding one of the post-synaptic neurons in a column direction;
   a plurality of synapses each including a first unit synapse and a second unit synapse;
   a plurality of first unit synapses of the plurality of synapses respectively disposed in intersection regions of the first row lines, the first column lines, and the first selecting lines;
   a plurality of second unit synapses of the plurality of synapses respectively disposed in intersection regions of the second row lines, the second column lines, and the second selecting lines;

a plurality of row signal delay circuits each disposed on each of the second row lines; and a plurality of selecting signal delay circuits each disposed on each of the second selecting lines, wherein each of the first unit synapses is electrically connected with a corresponding one of the first row lines, a corresponding one of the first column lines, and a corresponding one of the first selecting lines, wherein each of the second unit synapses is electrically connected with a corresponding one of the second row lines, a corresponding one of the second column lines, and a corresponding one of the second selecting lines, wherein each of the first unit synapses comprises a resistive memory device and a first selecting element, wherein each of the second unit synapses comprises a phase-changeable memory device and a second selecting element, wherein each of the first selecting elements is electrically connected with a corresponding one of the first selecting lines, wherein each of the second selecting elements is electrically connected with a corresponding one of the second selecting lines, wherein each of the row signal delay circuits includes an odd number of inverters, wherein each of the first unit synapses receives a first row signal from a corresponding one of the pre-synaptic neurons, wherein each of the second unit synapses receives a second row signal from a corresponding one of the pre-synaptic neurons through a corresponding one of the row signal delay circuits, and wherein the second row signal is an inverted signal of the first row signal.

2. The neuromorphic device of claim 1, wherein each of the post-synaptic neurons comprises:

a first totalizer electrically connected with a corresponding one of the first column lines;

a second totalizer electrically connected with a corresponding one of the second column lines;

a normalizer electrically connected with the first totalizer and the second totalizer;

an integrator electrically connected with the normalizer; and a pulse generator electrically connected with the integrator, and wherein the pulse generator is electrically connected with a corresponding one of the first selecting lines and a corresponding one of the second selecting lines.

3. The neuromorphic device of claim 1, wherein each of the selecting signal delay circuits includes an even number of inverters.

4. A neuromorphic device comprising:

a plurality of pre-synaptic neurons;

a plurality of row line pairs, each of the row line pairs extending from a corresponding one of the pre-synaptic neurons in a row direction, each of the row line pairs including a first row line and a second row line;

a plurality of post-synaptic neurons;

a plurality of column line pairs, each of the column line pairs extending from a corresponding one of the post-synaptic neurons in a column direction, each of the column line pairs including a first column line and a second column line;

a plurality of synapses coupled between a corresponding one of the row line pairs and a corresponding one of the column line pairs, each of the synapses being disposed in an intersection region between a corresponding one of the row line pairs and a corresponding one of the column line pairs in a matrix form; and a plurality of selecting line pairs, each of the selecting line pairs extending from a corresponding one of the post-synaptic neurons in the column direction, each of the selecting line pairs including a first selecting line and a second selecting line, wherein each of the synapses comprises a first unit synapse and a second unit synapse, the first unit synapse including a first memristor and a first selecting element that are connected with each other, the second unit synapse including a second memristor and a second selecting element that are connected with each other, the first row lines of the plurality of row line pairs and the first column lines of the plurality of column line pairs being coupled to the first unit synapses, respectively, and the second row lines of the plurality of row line pairs and the second column lines of the plurality of column line pairs being coupled to the second unit synapses, respectively, wherein the first selecting lines are coupled to the first selecting elements of the first unit synapses, respectively, and the second selecting lines are coupled to the second selecting elements of the second unit synapses, respectively, wherein each of the pre-synaptic neurons comprises a row signal delay circuit electrically connected with a corresponding one of the second row lines of the row line pairs, wherein each of the post-synaptic neurons comprises a selecting signal delay circuit electrically connected with a corresponding one of the second selecting lines of the selecting line pairs, wherein each of the selecting signal delay circuits includes an even number of inverters, wherein each of the first selecting elements receives a first selecting signal through each of the first selecting lines, wherein each of the second selecting elements receives a second selecting signal through each of the selecting signal delay circuits and each of the second selecting lines, and wherein the second selecting signal is a delayed signal of the first selecting signal.

5. The neuromorphic device of claim 4, wherein each of the post-synaptic neurons further comprises a pulse generator connected with a normalizer and a pulse delay circuit connected with the corresponding second selecting line.

6. The neuromorphic device of claim 4, wherein each of the post-synaptic neurons comprises:

a first totalizer electrically connected with a corresponding one of the first column lines;

a second totalizer electrically connected with a corresponding one of the second column lines; and a normalizer electrically connected with the first totalizer and the second totalizer.

7. The neuromorphic device of claim 4, wherein each of the row signal delay circuits includes an odd number of inverters.

* * * * *